US011706385B2

(12) United States Patent
Le (10) Patent No.: US 11,706,385 B2
(45) Date of Patent: Jul. 18, 2023

(54) MACHINE LEARNING-BASED MULTI-VIEW VIDEO CONFERENCING FROM SINGLE VIEW VIDEO DATA

(71) Applicant: ADVANCED MICRO DEVICES, INC., Santa Clara, CA (US)

(72) Inventor: Roto Le, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/490,512

(22) Filed: Sep. 30, 2021

(65) Prior Publication Data

US 2023/0101399 A1    Mar. 30, 2023

(51) Int. Cl.
*H04N 7/15* (2006.01)
*H04L 65/1083* (2022.01)
*H04L 65/403* (2022.01)
*G06N 20/00* (2019.01)
*G06F 3/04842* (2022.01)
*G06V 10/22* (2022.01)
*G06V 20/40* (2022.01)

(52) U.S. Cl.
CPC .......... *H04N 7/15* (2013.01); *G06F 3/04842* (2013.01); *G06N 20/00* (2019.01); *G06V 10/235* (2022.01); *G06V 20/41* (2022.01); *H04L 65/1083* (2013.01); *H04L 65/403* (2013.01)

(58) Field of Classification Search
CPC .......... H04N 7/15; G06K 9/00; G06F 3/0484; G06N 20/00
USPC ............................................ 348/14.01–14.16
See application file for complete search history.

(56) References Cited

U.S. PATENT DOCUMENTS

| 11,263,397 B1 * | 3/2022 | Yu ........................ G06F 40/169 |
| 2021/0035342 A1 * | 2/2021 | Glaser ..................... G06T 11/00 |
| 2021/0135892 A1 * | 5/2021 | Ghanaie-Sichanie ....................... H04N 7/147 |

* cited by examiner

*Primary Examiner* — Melur Ramakrishnaiah (57) ABSTRACT

Machine learning-based multi-view video conferencing from single view video data, including: identifying, in video data, a plurality of objects; and generating a user interface comprising a plurality of first user interface elements each comprising a portion of the video data corresponding to one or more of the plurality of objects.

20 Claims, 7 Drawing Sheets

FIG. 6

MACHINE LEARNING-BASED MULTI-VIEW VIDEO CONFERENCING FROM SINGLE VIEW VIDEO DATA

BACKGROUND

Video conferencing solutions are used to communicate with remotely located individuals. In some scenarios, a conference will include some participants located in the same room and other remotely located participants. In such a scenario, a camera will capture video of the room and its participants. The video is then sent to the remotely located participants.

DETAILED DESCRIPTION

Where a video conference is restricted to a single view of a room and its participants, several drawbacks emerge. It is difficult for remote participants to view any notes written on white boards or other media that are more easily viewed by the local participants. Where the conference is related to a presentation such as a slideshow, it is difficult for the remote participant to follow both the video feed and the presentation. Additionally, although the single view of the room includes multiple objects of interest, portion of the field of view of the camera is not of interest to the remote participants.

To that end, the present specification sets forth various implementations of machine learning-based multi-view video conferencing from single view video data. A method for machine learning-based multi-view video conferencing from single view video data includes identifying, in video data, a plurality of objects. The method also includes generating a user interface that includes a plurality of first user interface elements. Each of the first user interface elements includes a portion of the video data corresponding to one or more of the plurality of objects.

In some implementations, the user interface further includes a second user interface element including a content presentation. In some implementations, the plurality of first user interface elements and the second user interface elements each include one or more user interface frames. In some implementations, the method further includes providing the user interface to a computing device. In some implementations, the method further includes receiving the video data. In some implementations, the content presentation includes a slide presentation. In some implementations, identifying the plurality of objects includes providing the video data to an object detection model. In some implementations, the object detection model classifies the plurality of objects and the plurality of objects correspond to one or more particular object classifications. In some implementations, the plurality of objects correspond to a user selection of objects for inclusion in the user interface.

The present specification also describes various implementations of an apparatus for machine learning-based multi-view video conferencing from single view video data. Such an apparatus includes a computer processor and a computer memory including computer program instructions that, when executed by the computer processor, cause the computer processor to carry out: identifying, in video data, a plurality of objects; and generating a user interface including a plurality of first user interface elements each including a portion of the video data corresponding to one or more of the plurality of objects.

In some implementations, the user interface further includes a second user interface element including a content presentation. In some implementations, the plurality of first user interface elements and the second user interface elements each include one or more user interface frames. In some implementations, the computer program instructions, when executed, further cause the computer processor to carry out: providing the user interface to a computing device. In some implementations, the computer program instructions, when executed, further cause the computer processor to carry out: receiving the video data. In some implementations, the content presentation includes a slide presentation. In some implementations, identifying the plurality of objects includes providing the video data to an object detection model. In some implementations, the object detection model classifies the plurality of objects and the plurality of objects correspond to one or more particular object classifications. In some implementations, the plurality of objects correspond to a user selection of objects for inclusion in the user interface.

Also described in this specification are various implementations of computer program product for machine learning-based multi-view video conferencing from single view video data. Such a computer program product is disposed upon a non-transitory computer readable medium that includes computer program instructions that, when executed, cause a computer system to perform steps including: identifying, in video data, a plurality of objects; and generating a user interface including a plurality of first user interface elements each including a portion of the video data corresponding to one or more of the plurality of objects.

In some implementations, the user interface further includes a second user interface element including a content presentation.

Figure 1:
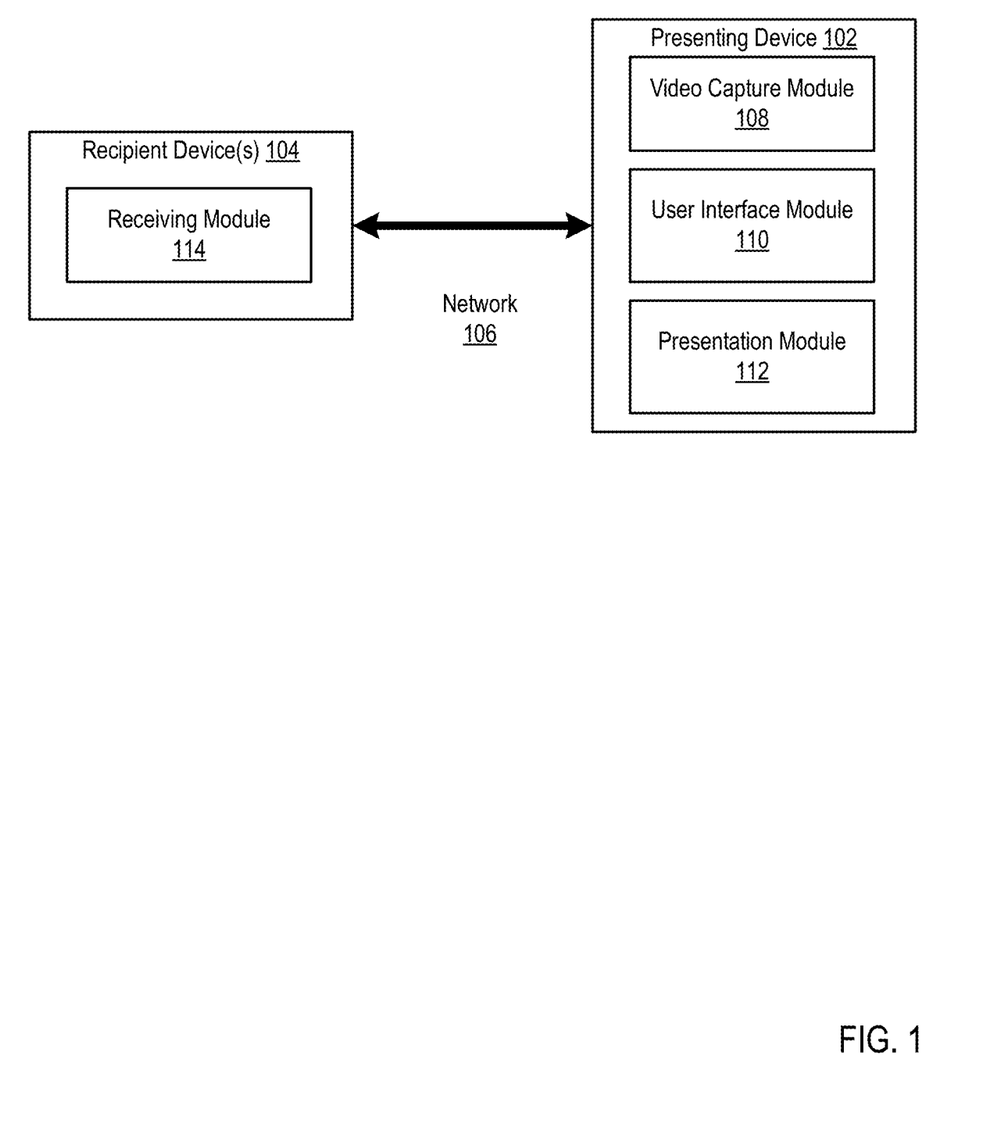
FIG. 1 is a block diagram of an example system for machine learning-based multi-view video conferencing from single view video data according to some implementations.

Various implementations of machine learning-based multi-view video conferencing from single view video data are described in greater detail below with respect to various figures. FIG. 1 is a block diagram of a non-limiting example system for machine learning-based multi-view video conferencing from single view video data according to some implementations of the present disclosure. The example system of FIG. 1 includes a presenting device 102 and one or more recipient devices 104. Each of the presenting device 102 and recipient devices 104 can be implemented using a variety of computing devices, including mobile devices, personal computers, peripheral hardware components, gaming devices, set-top boxes, and the like. The presenting device 102 and recipient devices 104 are communicatively coupled by a network 106. The network 106 includes one or more communications paths between the presenting device 102 and the recipient devices 104. In some implementations, the network 106 also communicatively couples the recipient devices 104 to one another. The network 106 is embodied as one or more wired networks, one or more wireless networks, or combinations thereof.

The presenting device 102 includes a video capture module 108. The video capture module 108 encodes video data from a single camera feed. For example, the video capture module 108 encodes video data from a camera communicatively coupled to the presenting device 102 (e.g., as a component of the presenting device 102 or otherwise accessible to the presenting device 102).

The presenting device 102 also includes a user interface module 110 that facilitates machine learning-based multi-view video conferencing from single view video data according to some implementations of the present disclosure. The user interface module 110 identifies, in the captured video data, a plurality of objects. Each object is an image object (e.g., a particular grouping of pixels) within the video data (e.g., within a frame of the video data). For example, each object corresponds to a particular physical object or entity captured in the video data.

In some implementations, identifying the plurality of objects includes providing the video data (e.g., one or more frames of the video data) to an object detection model. The object detection model is a machine learning model such as a neural network or other model that accepts, as input, one or more frames of video data and provides, as output, an identification of one or more objects in the input video data. For example, in some implementations, the object detection model provides, as output, pixel coordinates or bounding boxes identifying the locations of particular objects within the video data. As another example, in some implementations, the object detection model provides, as output, an object mask such as an image or pixel mask that maps to particular objects within the video data.

The object detection model can also include a classifier model that classifies the identified objects. Classifying an object includes assigning a label or classification to the particular identified object. As an example, assuming video data depicting a presentation where a presenter is speaking to an audience and writing notes on a white board, the object detection model identifies and classifies objects such as "presenter," "white board," "audience member," and the like. In some implementations, the object detection identifies multiple objects as a grouping of objects. For example, multiple individual audience members are classified as an "audience" grouping.

The user interface module 110 then generates a user interface including a plurality of first user interface elements, with each including a portion of the video data corresponding to one or more of the plurality of objects. A portion of the video data corresponding to a given object is an isolated subsection of the video data (e.g., an isolated subsection of each frame) that includes the given object. As an example, a portion of the video data corresponding to a "presenter" object is a portion of the video data that captures the presenter. The portion of the video data is considered zoomed in or focused on the corresponding object. A user interface can include a portion of the video data corresponding to multiple objects (e.g., a grouping of objects). Multiple objects are grouped for inclusion in a same user interface element in response to their distance (e.g., between objects or bounding boxes) being less than a threshold, in response to objects or bounding boxes overlapping, in response to the objects being related (e.g., based on predefined relationships between particular object classifications), or in response to other criteria.

In some implementations, each of the first user elements includes a user interface frame or panel within a same user interface. Thus, each user interface frame renders a portion of the video data corresponding to an identified object. As described herein, a user interface frame is an allocated portion of the area or resolution of the user interface dedicated to a particular purpose or functionality (e.g., rendering corresponding portions of video). In some implementations, upscaling or other transformations are applied to particular portions of the video data. For example, a particular portion of the video data corresponding to a given object is scaled to a resolution of the corresponding user interface element in which the portion of video data will be displayed.

The particular objects in the video data having corresponding user interface elements in the user interface can be determined based on having particular classification types. The particular objects in the video data having corresponding user interface elements in the user interface can also or optionally be determined by a user selection. Assume, for example, that the user interface module 110 identifies objects "A," "B," "C," and "D" in the video data. A user selection of objects "A" and "C" causes the user interface module 110 to generate a user interface with user interface elements displaying the portions of the video data corresponding to objects "A" and "C" but not objects "B" or "D." One skilled in the art will appreciate that, during display or presentation of the user interface, a modification of the selected objects by a user will cause the user interface to add, remove, or modify user interface elements to reflect the selected objects. Moreover, one skilled in the art will appreciate that, in some implementations, the resolution or size of the user interface elements are controllable or modifiable by a user interacting with the user interface.

In some implementations, the user interface includes a second user interface element including or corresponding to a content presentation. The content presentation is audio, video, or text content independent from the video data. For example, the content presentation includes a slideshow presentation. Accordingly, the user interface includes a user interface element showing or presenting the content presentation concurrent to the portions of the video data in the other first user interface elements. The portions of the content presentation included in the second user interface element can be determined or controlled by the presenting device 102. For example, the presenting device 102 selects a current or active slide in the content presentation for rendering and display in the user interface. In some implementations, the current slide is determined by a user selection (e.g., by a user of the presenting device 102). In other implementations, the current slide is determined by a timer or other automatically triggered event. In further implementations, the current slide is determined or selected by the recipient device 104 or a user of the recipient device 104.

The presenting device 102 also includes a presentation module 112 that provides content or data to the recipient device(s) 104. In some implementations, the presentation module 112 provides the user interface or portions of the user interface generated by the user interface module 110 to recipient devices 104. For example, the presentation module 112 encodes video data or a video stream of a rendering of the generated user interface and provides the encoded video data or video stream to the recipient devices 104. Thus, the recipient devices 104 receive the user interface embodied as video data or a video stream rendering the user interface. For example, the recipient devices 104 receive video data depicting a user interface including multiple user interface elements each including portions of video data (e.g., encoded by the video capture module 108) corresponding to different identified objects.

In other implementations, the presentation module 112 provides the user interface to recipient devices 104 embodied as multiple video streams or multiple portions of video content. As an example, the presentation module 112 provides, to recipient devices 104, the portions of video content corresponding to objects identified in the video data by the user interface module 110. Referring back to the example above where the user interface module 110 identifies objects "A," "B," "C," and "D" in the video data, with objects "A" and "C" selected for inclusion in the generated user interface. In some implementations, the presentation module 112 provides, to the recipient device(s) 104, the portions of the video data corresponding to objects "A" and "C." These portions of video data are then displayable by the recipient device 104 in an application- or web page-based user interface. In some implementations, the presentation module 112 refrains from providing the portions of video data corresponding to unselected objects (e.g., objects "B" and "D" in this example) to conserve bandwidth and network resources. In other implementations, the presentation module 112 provides the portions of video data corresponding to unselected objects. In some implementations, the particular selected objects are automatically selected based on their respective classifications or labels from the object detection module. For example, "presenter" or "white board" objects are automatically included for selection, while "audience" objects are not automatically selected. One skilled in the art will appreciate that, in some implementations, such automatic selections are subject to subsequent user modification. Moreover, one skilled in the art will appreciate that, in some implementations, such automatic selections are based on user preferences or user selections of particular objects for automatic inclusion in a user interface.

In some implementations, providing the user interface to the recipient devices 104 includes providing a content presentation (e.g., a slideshow presentation) or portion of the content presentation. For example, in some implementations, the presentation module 112 provides the content presentation as video data or a video stream (e.g., capturing the content presentation). In other implementations, the presentation module 112 provides the content presentation as encoded as data for a native application (e.g., as slideshow or image data). Accordingly, in some implementations, the presentation module 112 provides, to the recipient devices 104, an indication of an active or current slide that causes the active or current slide to be selected from the content presentation for display by the recipient devices 104.

The recipient devices 104 each include receiving modules 114 for displaying content or data received from presenting devices 102. For example, in some implementations, the receiving modules 114 include video players or other applications for rendering and displaying video content received from presenting devices 102. Continuing this example, where the presenting device 102 encodes the user interface as a video stream provided to recipient devices 104, the receiving modules 114 decode and render for display the video stream. In some implementations, the receiving modules 114 include dedicated applications that display one or more portions of video content received from the presenting device 102. For example, the receiving module 114 displays, in respective user interface elements, portions of video data corresponding to respective video objects received from the presenting device 102.

In some implementations, the receiving module 114 allows a user of a recipient device 104 to select particular objects whose portions of video data will be included in the user interface. In some implementations, the selection of particular objects is provided back to the presenting device 102. In some implementations, the presentation module 112 provides particular portions of video data to the recipient devices 104 based on the selected objects. In other implementations, the user interface module 110 includes, in a video stream rendering of the user interface, the particular portions of video data based on the selected objects.

One skilled in the art will appreciate that the approaches described above allow for generation of a multiple view user interface from single view video data, with each of the generated views corresponding to particular identified objects. Moreover, the approaches described above allow for a user or recipient of a presentation to select particular objects for inclusion in the multiple view user interface. Furthermore, the multiple view user interface allows for content presentations to be viewed concurrent to various generated views of the video data.

One skilled in the art will appreciate that, in some implementations, any of the modules or functions described above as being implemented in a presenting device 102 are instead implemented in a recipient device 104. Accordingly, although the above discussion describes a user interface generated by a presenting device 102 and provided to recipient devices 104 as video data or as separate data streams, one skilled in the art will appreciate that, in some implementations, functionality described above as being performed by a presenting device 102 is instead performed by a recipient device 104.

For example, assume that a presenting device 102 provides single view video data (e.g., from a video capture module 108) to a recipient device 104. The recipient device 104 (e.g., by virtue of a user interface module 110 implemented in the recipient device 104) then identifies particular objects in the received video data. The recipient device 104 then generates a user interface with user interface elements for portions of the video data corresponding to identified devices.

Figure 2A:
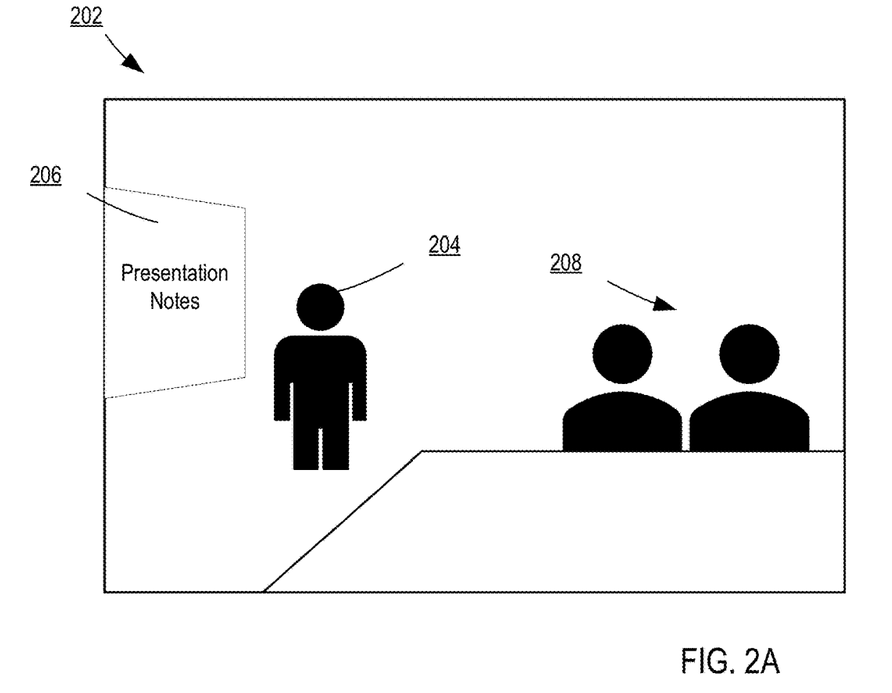
FIG. 2A is part of an example process flow for machine learning-based multi-view video conferencing from single view video data according to some implementations.
Figure 2B:
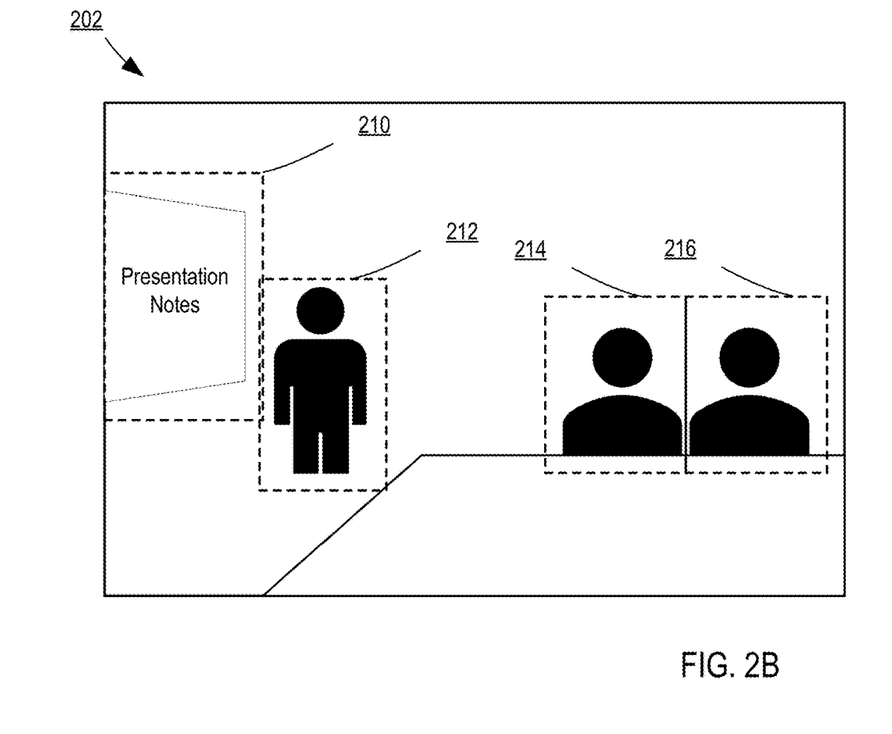
FIG. 2B is part of an example process flow for machine learning-based multi-view video conferencing from single view video data according to some implementations.
Figure 2C:
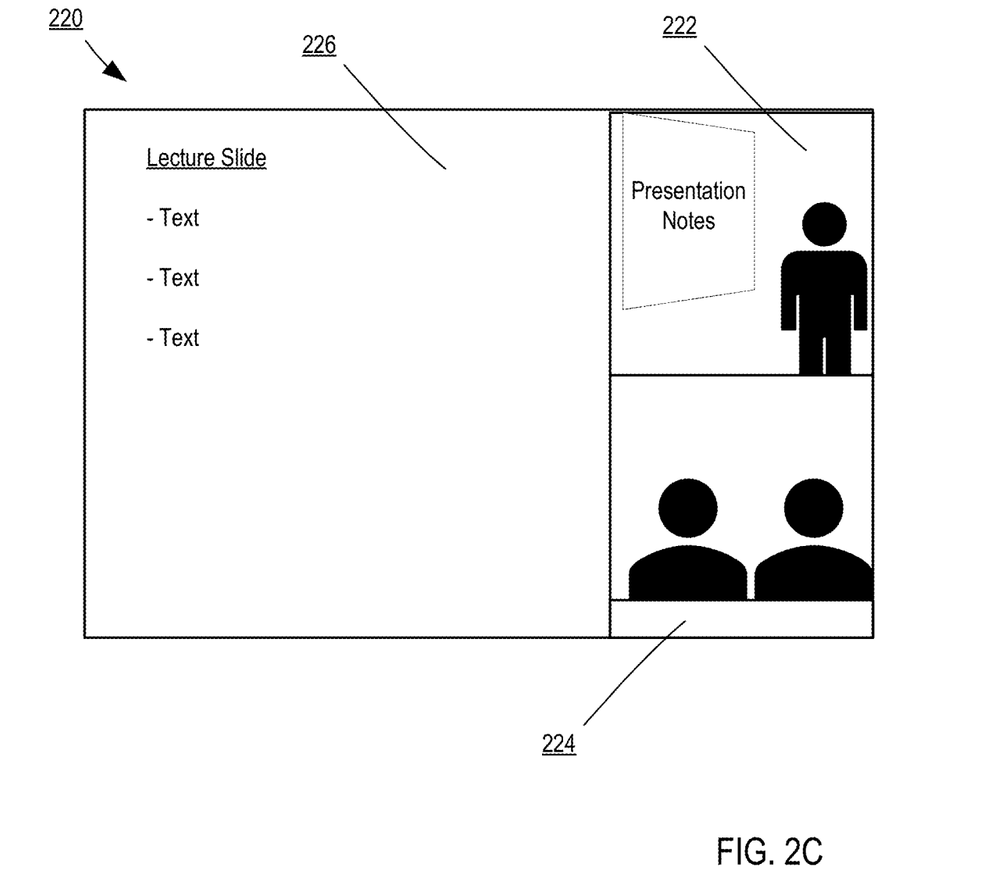
FIG. 2C is part of an example process flow for machine learning-based multi-view video conferencing from single view video data according to some implementations.

Consider an example such as that beginning at FIG. 2A. FIGS. 2A-2C show an example process flow for machine learning-based multi-view video conferencing from single view video data according to some implementations of the present disclosure. In this example, assume that a lecturer is conducting a college course with in-person students and remote students. Further assume that the lecture follows a slideshow presentation.

A camera capturing the lecture hall generates video data 202 (e.g., as encoded by a video capture module 108). The video data 202 shows the lecturer 204 speaking to the audience 208 and writing additional notes on a white board 206. Were a remote student to simply receive and display this video data 202, the remote student will not be able to see or decipher notes written on the white board 206. Moreover, valuable screen real estate is used to display the audience 208, which the remote student does not care to view.

Accordingly, as shown in FIG. 2B, a user interface module 110 identifies, as objects, the lecturer 204, the white board 206, and each member of the audience 208 as shown by the respective bounding boxes 210, 212, 214, and 216. Each bounding box is an area of pixels into which a corresponding object is included.

As shown in FIG. 2C, a user interface 220 is generated. The user interface 220 is displayed, for example, by a recipient device 104. In the user interface 220, a first frame 222 (e.g., a user interface element) displays video data including the lecturer 204 and the white board 206 (e.g., by virtue of their proximity, predefined relationship, and the like) and a second frame 224 displays video data including the audience 208. One skilled in the art will appreciate that, in some implementations, the particular objects included in the frame 222 and frame 224 are determined based on particular selections by the user of the recipient device 104, a presenting device 102, or based on other selections.

A third frame 226 displays the slideshow presentation. In some implementations, the currently displayed slide is selected or controlled by the user of the recipient device 104. In some implementations, the currently displayed slide is selected or controlled by the user of the presenting device 102. In some implementations, the currently displayed slide is selected or controlled by a timer or other queuing system.

The user interface 220 is encoded as video data and provided to the recipient device 104 for decoding and rendering. The user interface 220 corresponds to an application executed by the recipient device 104. Such an application then receives and displays content received from the presenting device 102. For example, the application receives separate video content for display in the frame 222 and frame 224. As another example, in some implementations, the application receives the video data 202 and an identification of coordinates, bounding boxes, or other pixel boundaries that define the potions of video content for display in the frame 222 and frame 224. In a further example, the application receives the video data 202 and identifies (e.g., by virtue of the functionality described above with respect to a user interface module 110), in the video data 202, the particular objects and corresponding portions of video data 202.

The particular content displayed in each of the frames 222, 224, 226 is changeable in response to user inputs. For example, a user input will cause other content (e.g., the video data currently displayed in the frame 222 or frame 224) to be displayed in the larger frame 226. As another example, a selection of other objects detected in the video data 202 (e.g., by virtue of a dropdown menu or checkbox) changes the particular content displayed in a given frame 222, 224, 226. The particular layout, dimensions, and numbers of frames 222, 224, 226 is similarly configurable. Although FIG. 2C shows a particular layout of a user interface 220, it is understood that other layouts and dimensions of user interfaces 220 are also contemplated within the scope of the present disclosure.

Machine learning-based multi-view video conferencing from single view video data in accordance with the present application is generally implemented with computers, that is, with automated computing machinery. For further explanation, therefore, FIG. 3 sets forth a block diagram of computing machinery including an exemplary computer 300 configured for machine learning-based multi-view video conferencing from single view video data according to certain implementations. For example, the participant devices 102a-n of FIG. 1 are implemented as a computer 300 of FIG. 3. The computer 300 of FIG. 3 includes at least one computer processor 302 or 'CPU' as well as random access memory (RAM) 304 which is connected through a high speed memory bus 306 and bus adapter 308 to processor 302 and to other components of the computer 300.

Figure 3:
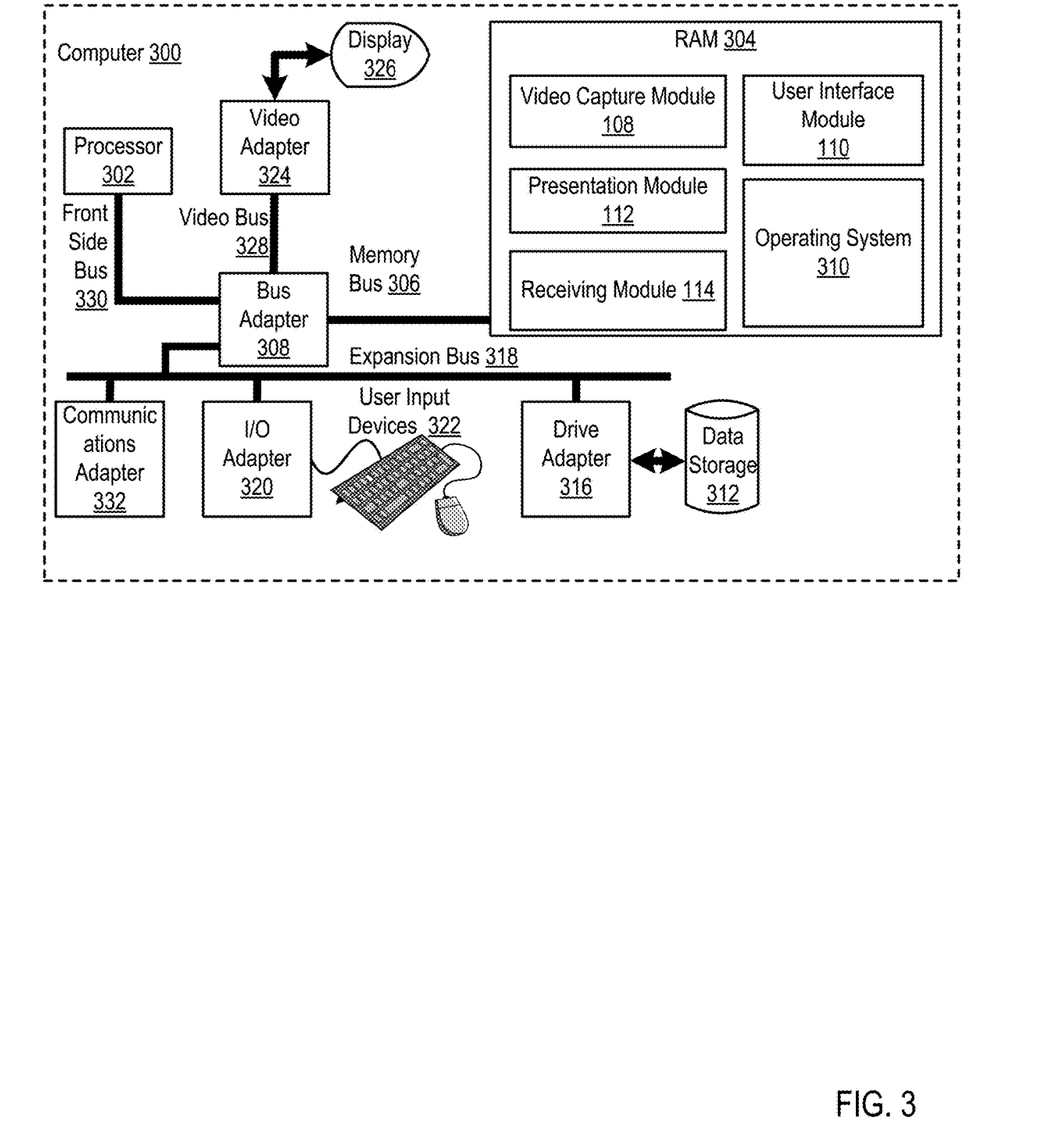
FIG. 3 is a block diagram of an example computer for machine learning-based multi-view video conferencing from single view video data according to some implementations.

Stored in RAM 304 is an operating system 310. Operating systems useful in computers configured for machine learning-based multi-view video conferencing from single view video data according to certain implementations include UNIX™, Linux™, Microsoft Windows™ and others as will occur to those of skill in the art. The operating system 310 in the example of FIG. 3 is shown in RAM 304, but many components of such software typically are stored in non-volatile memory also, such as, for example, on data storage 312, such as a disk drive. Also stored in RAM 304 are a video capture module 108, a user interface module 110, a presentation module 112, and a receiving module 114 according to certain implementations.

The computer 300 of FIG. 3 includes disk drive adapter 316 coupled through expansion bus 318 and bus adapter 308 to processor 302 and other components of the computer 300. Disk drive adapter 316 connects non-volatile data storage to the computer 300 in the form of data storage 312. Disk drive adapters useful in computers configured for machine learning-based multi-view video conferencing from single view video data according to certain implementations include Integrated Drive Electronics (IDE') adapters, Small Computer System Interface (SCSI') adapters, and others as will occur to those of skill in the art. In some implementations, non-volatile computer memory is implemented as an optical disk drive, electrically erasable programmable read-only memory (so-called 'EEPROM' or 'Flash' memory), RAM drives, and so on, as will occur to those of skill in the art.

The example computer 300 of FIG. 3 includes one or more input/output ('I/O') adapters 320. I/O adapters implement user-oriented input/output through, for example, software drivers and computer hardware for controlling output to display devices such as computer display screens, as well as user input from user input devices 322 such as keyboards and mice. The example computer 300 of FIG. 3 includes a video adapter 324, which is an example of an I/O adapter specially designed for graphic output to a display device 326 such as a display screen or computer monitor. Video adapter 324 is connected to processor 302 through a high speed video bus 328, bus adapter 308, and the front side bus 330, which is also a high speed bus.

The exemplary computer 300 of FIG. 3 includes a communications adapter 332 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters implement the hardware level of data communications through which one computer sends data communications to another computer, directly or through a data communications network. Examples of communications adapters useful in computers configured for machine learning-based multi-view video conferencing from single view video data according to certain implementations include modems for wired dial-up communications, Ethernet (IEEE 802.3) adapters for wired data communications, and 802.11 adapters for wireless data communications.

Figure 4:
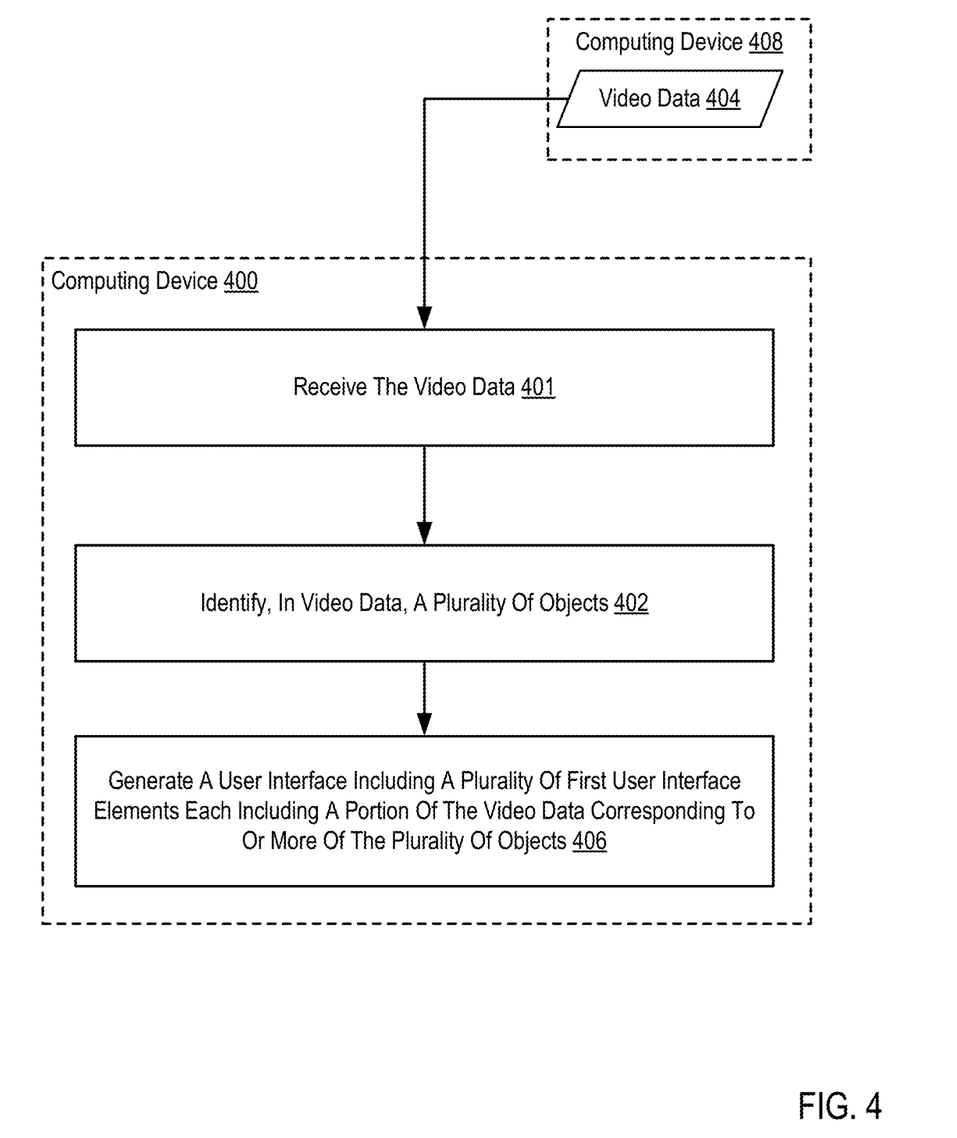
FIG. 4 is a flowchart of an example method for machine learning-based multi-view video conferencing from single view video data according to some implementations.

For further explanation, FIG. 4 sets forth a flow chart illustrating an example method for machine learning-based multi-view video conferencing from single view video data according to some implementations of the present disclosure. The method of FIG. 4 is executed in a computing device 400 such as a presenting device 102, a receiving device 104, or combinations thereof as set forth in the figures above.

The method of FIG. 4 includes receiving 401 the video data 404. The video data 404 is received from another computing device 408. Although the video data 404 is shown here as being received from another computing device 408 (and later processed to generate a user interface as described below in greater detail), other implementations include the computing device capturing the video data from a video capture device. That is, the example of FIG. 4 sets forth an implementation in which a presenting device sends video data "to be processed" to a recipient device that proceeds with processing the video data, while in other implementations, the presenting device itself carries out the processing.

The method of FIG. 4 includes identifying 402, in video data 404, a plurality of objects. The video data 404 includes single view video data 404 (e.g., video data 404 for the field of view of a single camera). As will be described in further detail below, in some implementations, the video data 404 is generated or encoded by the computing device 400. In other implementations, the video data 404 is received by the computing device 400 from another computing device.

Each object is an image object (e.g., a particular grouping of pixels) within the video data 404 (e.g., within a frame of the video data 404). For example, each object corresponds to a particular physical object or entity captured in the video data 404. As will be described in further detail below, in some implementations, identifying 402 the plurality of objects includes providing the video data to an object detection model. In other implementations, identifying 402 the plurality of objects includes applying an object segmentation algorithm to one or more frames of the video data.

Identifying 402 the plurality of objects in some implementations includes identifying one or more bounding boxes for identified objects. A bounding box is a boundary of pixels inside which a particular object is located. In other implementations, identifying 402 the plurality of objects includes generating one or more object masks each corresponding to an identified object. An object mask is a collection of pixels mapped to the particular pixels of an object within the video data 404.

The method of FIG. 4 also includes generating 406 a user interface including a plurality of first user interface elements each including a portion of the video data 404 corresponding to or more of the plurality of objects. A portion of the video data 404 corresponding to a given object is an isolated subsection of the video data 404 (e.g., an isolated subsection of each frame) that includes the given object. As an example, a portion of the video data 404 corresponding to a "presenter" object is a portion of the video data 404 that captures the presenter. In some implementations, the portion of the video data 404 is considered zoomed in or focused on the corresponding object.

Each of the first user elements includes a user interface frame or panel within a same user interface in some implementations. Each user interface frame displays a portion of the video data 404 corresponding to an identified object or grouping of objects. As described herein, a user interface frame is an allocated portion of the area or resolution of the user interface dedicated to a particular purpose or functionality (e.g., rendering corresponding portions of video). In some implementations, upscaling or other transformations are applied to particular portions of the video data 404. For example, a particular portion of the video data 404 corresponding to a given object is scaled to a resolution of the corresponding user interface element in which the portion of video data 404 will be displayed.

The particular objects whose video data is displayed in a user interface element are determined by a user selection in some implementations. Assume that the user interface module 110 identifies objects "A," "B," "C," and "D" in the video data. A user selection of objects "A" and "C" causes the user interface to include user interface elements displaying the portions of the video data corresponding to objects "A" and "C" but not objects "B" or "D." One skilled in the art will appreciate that, during display or presentation of the user interface, a modification of the selected objects by a user will cause the user interface to add, remove, or modify user interface elements to reflect the selected objects. Moreover, one skilled in the art will appreciate that, in some implementations, the resolution or size of the user interface elements are controllable or modifiable by a user interacting with the user interface.

The user interface also includes, in some implementations, a second user interface element including or corresponding to a content presentation. The content presentation is audio, video, or text content independent from the video data 404. For example, the content presentation includes a slideshow presentation. Accordingly, in some implementations, the user interface includes a user interface element showing or presenting the content presentation concurrent to the portions of the video data in the other first user interface elements. In some implementations, the portions of the content presentation included in the second user interface element are determined or controlled by a user of the computing device 400. In other implementations, the portions of the content presentation included in the second user interface element are determined by a timer or other automatically triggered event.

In some implementations, the user interface is encoded as video data and provided to another computing device. In other implementations, the user interface is encoded as video data and displayed by the computing device. In some implementations, the user interface corresponds to an application executed by the computing device 400. Such an application then receives and displays content (e.g., portions of the video content corresponding to identified objects, portions of a content presentation) in the user interface elements. For example, in some implementations, the application receives separate video content for display in the first user interface elements. As another example, in some implementations, the application receives the video data 404 and an identification of coordinates, bounding boxes, or other pixel boundaries that define the potions of video data 404 for display in the first user interface elements. In a further example, the application receives the video data 404 and identifies, in the video data 404, the particular objects and corresponding portions of video data 404.

Figure 5:
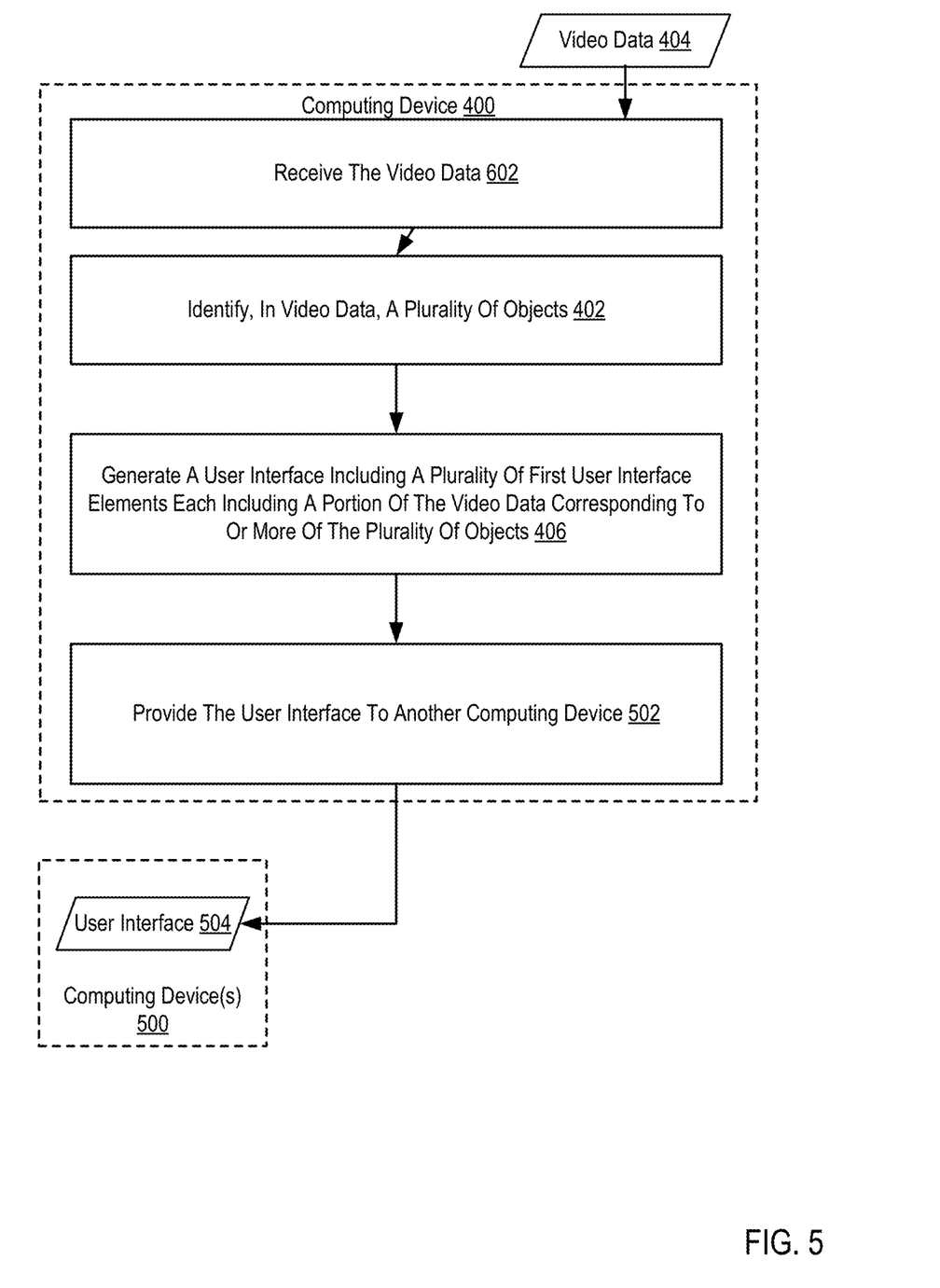
FIG. 5 is a flowchart of another example method for machine learning-based multi-view video conferencing from single view video data according to some implementations.

For further explanation, FIG. 5 sets forth a flow chart illustrating another example method for machine learning-based multi-view video conferencing from single view video data according to implementations of the present disclosure. The method of FIG. 5 is similar to that of FIG. 4 except that the method of FIG. 5 includes providing 502 the user interface 504 to another computing device 500 (e.g., a recipient device 104). Providing 502 the user interface 504 to another computing device 500 includes encoding video data rendering the user interface 504 and providing the encoded video data to the other computing device 500 for display. In some implementations, providing 502 the user interface 504 can optionally include generating a web page or content rendered or decoded by an application executed on the computing device 500 that causes the user interface 504 to be rendered on the other computing device 500. In some implementations, providing 502 the user interface 504 can also optionally include providing portions of the video data 404 corresponding to identified objects for display in the user interface 504. Providing 502 the user interface 504 can also optionally include providing the video data 404 and an identification of the portions of the video data 404 corresponding identified objects for display in the user interface 504. Such identifications include particular coordinates of bounding boxes or subsections of the video data, image object masks, and the like.

Figure 6:
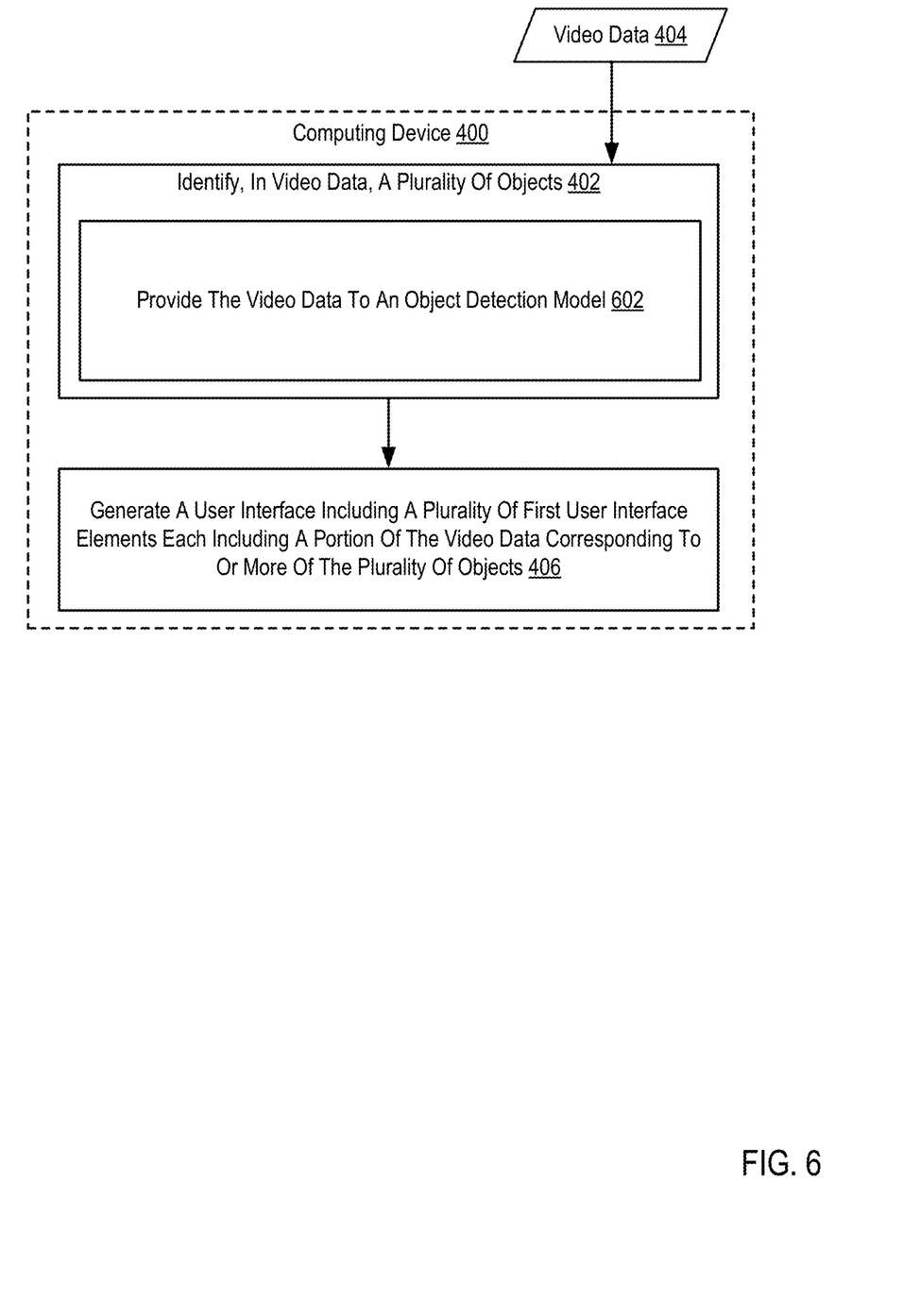
FIG. 6 is a flowchart of another example method for machine learning-based multi-view video conferencing from single view video data according to some implementations.

For further explanation, FIG. 6 sets forth a flow chart illustrating another example method for machine learning-based multi-view video conferencing from single view video data according to implementations of the present disclosure. In the method of FIG. 6 identifying 402 a plurality of objects in video data 404 is carried out by providing 602 the video data 404 to an object detection model. The object detection model is a machine learning model such as a neural network or other model that accepts, as input, one or more frames of video data 404 and provides, as output, an identification of one or more objects in the input video data 404. For example, in some implementations, the object detection model provides, as output, pixel coordinates or bounding boxes identifying the locations of particular objects within the video data 404. As another example, in some implementations, the object detection model provides, as output, an object mask such as an image or pixel mask that maps to particular objects within the video data 404.

In some implementations, the object detection model includes a classifier model that classifies the identified objects. In some implementations, classifying an object includes assigning a label or classification to the particular identified object. As an example, assuming video data depicting a presentation where a presenter is speaking to an audience and writing notes on a white board, the object detection model will identify and classify objects such as "presenter," "white board," "audience member," and the like. In some implementations, the object detection identifies multiple objects as a grouping of objects. For example, multiple individual audience members are classified as an "audience" grouping.

In view of the explanations set forth above, readers will recognize that there are multiple benefits of machine learning-based multi-view video conferencing from single view video data according to implementations of the present disclosures. Some such benefits include, improved performance of a computing system by generating a multi-view video user interface from single view video data, video presentation that more efficiently provides what a user prefers to view, reduced bandwidth utilization in some implementations, and so on as will occur to readers of skill in the art.

Exemplary implementations of the present disclosure are described largely in the context of a fully functional computer system for machine learning-based multi-view video conferencing from single view video data. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary implementations described in this specification are oriented to software installed and executing on computer hardware, nevertheless, alternative implementations implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some implementations, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various implementations of the present disclosure. The descriptions in this specification are for purposes of illustration only and are not to be construed in a limiting sense. The scope of the present disclosure is limited only by the language of the following claims.

What is claimed is:

1. A method for machine learning-based multi-view video conferencing from single view video data, the method comprising:
   identifying, in video data, a plurality of objects; and
   generating a user interface comprising a plurality of first user interface elements each comprising a portion of the video data corresponding to one or more of the plurality of objects, wherein the user interface includes a grouping of two or more of the plurality of objects into a same user interface element of the plurality of first user interface elements based on a relationship between the two or more of the plurality of objects.

2. The method of claim 1, wherein the user interface further comprises a second user interface element comprising a content presentation.

3. The method of claim 2, wherein the content presentation comprises a slide presentation.

4. The method of claim 2, wherein the plurality of first user interface elements and the second user interface element each comprise one or more user interface frames.

5. The method of claim 1, wherein identifying the plurality of objects comprises providing the video data to an object detection model.

6. The method of claim 5, wherein the object detection model classifies the plurality of objects and the plurality of objects correspond to one or more particular object classifications.

7. The method of claim 6, wherein the plurality of objects correspond to a user selection of objects for inclusion in the user interface.

8. An apparatus for machine learning-based multi-view video conferencing from single view video data, the apparatus comprising a computer processor and a computer memory, the computer memory including computer program instructions that, when executed by the computer processor, cause the computer processor to carry out:
   identifying, in video data, a plurality of objects; and
   generating a user interface comprising a plurality of first user interface elements each comprising a portion of the video data corresponding to one or more of the plurality of objects, wherein the user interface includes a grouping of two or more of the plurality of objects into a same user interface element of the plurality of first user interface elements based on a relationship between the two or more of the plurality of objects.

9. The apparatus of claim 8, wherein the user interface further comprises a second user interface element comprising a content presentation.

10. The apparatus of claim 9, wherein the content presentation comprises a slide presentation.

11. The apparatus of claim 9, wherein the plurality of first user interface elements and the second user interface element each comprise one or more user interface frames.

12. The apparatus of claim 8, wherein identifying the plurality of objects comprises providing the video data to an object detection model.

13. The apparatus of claim 12, wherein the object detection model classifies the plurality of objects and the plurality of objects correspond to one or more particular object classifications.

14. The apparatus of claim 8, wherein the plurality of objects corresponds to a user selection of objects for inclusion in the user interface.

15. A computer program product disposed upon a non-transitory computer readable medium, the computer program product comprising computer program instructions for machine learning-based multi-view video conferencing from single view video data that, when executed, cause a computer system to perform steps comprising:

identifying, in video data, a plurality of objects; and generating a user interface comprising a plurality of first user interface elements each comprising a portion of the video data corresponding to one or more of the plurality of objects, wherein the user interface includes a grouping of two or more of the plurality of objects into a same user interface element of the plurality of first user interface elements based on a relationship between the two or more of the plurality of objects.

16. The computer program product of claim 15, wherein the user interface further comprises a second user interface element comprising a content presentation.

17. The computer program product of claim 16, wherein the content presentation comprises a slide presentation.

18. The computer program product of claim 16, wherein the plurality of first user interface elements and the second user interface element each comprise one or more user interface frames.

19. The computer program product of claim 15, wherein identifying the plurality of objects comprises providing the video data to an object detection model.

20. The computer program product of claim 19, wherein the object detection model classifies the plurality of objects and the plurality of objects correspond to one or more particular object classifications.

\* \* \* \* \*